(12) United States Patent
Tie et al.

(10) Patent No.: US 8,417,955 B2
(45) Date of Patent: Apr. 9, 2013

(54) ENTITY BIDIRECTIONAL AUTHENTICATION METHOD AND SYSTEM

(75) Inventors: Manxia Tie, Shaanxi (CN); Jun Cao, Shaanxi (CN); Zhenhai Huang, Shaanxi (CN); Xiaolong Lai, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 0 days.

(21) Appl. No.: 12/808,049

(22) PCT Filed: Dec. 9, 2008

(86) PCT No.: PCT/CN2008/073389
§ 371 (c)(1),
(2), (4) Date: Jun. 14, 2010

(87) PCT Pub. No.: WO2009/076879
PCT Pub. Date: Jun. 25, 2009

(65) Prior Publication Data
US 2010/0262832 A1    Oct. 14, 2010

(30) Foreign Application Priority Data
Dec. 14, 2007   (CN) .......................... 2007 1 0199241

(51) Int. Cl.
*H04L 29/06* (2006.01)
(52) U.S. Cl. .......... 713/176; 713/171; 713/168; 726/12; 380/247; 380/273
(58) Field of Classification Search ................... 713/176
See application file for complete search history.

(56) References Cited

U.S. PATENT DOCUMENTS

| | | |
|---|---|---|
| 2002/0157002 A1 | 10/2002 | Messerges et al. |
| 2002/0164026 A1 | 11/2002 | Huima |
| 2003/0041240 A1 | 2/2003 | Roskind et al. |
| 2007/0245414 A1 | 10/2007 | Chan et al. |
| 2008/0235513 A1* | 9/2008 | Foster et al. .................. 713/185 |

FOREIGN PATENT DOCUMENTS

| | | |
|---|---|---|
| CN | 1345498 | 4/2002 |
| CN | 1588842 A | 3/2005 |
| CN | 1697373 A | 11/2005 |

(Continued)

OTHER PUBLICATIONS

Kwon, Taekyoung, Myeongho Kang and Jooseok Song. "An Adaptable and Reliable Authentication Protocol for Communication Networks." Computer Science and Engineering Department, University of South Carolina, Columbia, SC (2006).*

(Continued)

*Primary Examiner* — Taghi Arani
*Assistant Examiner* — Narciso Victoria
(74) *Attorney, Agent, or Firm* — Harness, Dickey & Pierce, P.L.C.

(57) ABSTRACT

An entity bidirectional authentication method and system, the method involves: the first entity sends the first message; the second entity sends the second message to the credible third party after receiving the said first message; the said credible third party returns the third message after receiving the second message; the said second entity sends the fourth message after receiving the third message and verifying it; the said first entity receives the said fourth message and verifies it, completes the authentication. Compared with the conventional authentication mechanism, the invention defines an on-line retrieval and authentication mechanism of a public key, realizes the centralized management for it, simplifies the operating condition of the protocol, and facilitates the application and implement.

10 Claims, 5 Drawing Sheets

FOREIGN PATENT DOCUMENTS

| | | |
|---|---|---|
| CN | 1767429 A | 5/2006 |
| CN | 1929380 A | 3/2007 |
| CN | 101222328 A | 7/2008 |
| CN | 101247223 A | 8/2008 |
| EP | 1601154 A1 | 11/2005 |
| JP | 2006505203 A | 2/2006 |
| RU | 2308080 C2 | 10/2007 |
| WO | WO-03096339 A2 | 11/2003 |
| WO | WO-2006048043 A1 | 5/2006 |

OTHER PUBLICATIONS

Xu, Sen, and Chin-Tser Huang. "Attacks on PKM Protocols of IEEE 802.16 and Its Later Versions." Computer Science and Engineering Department, University of South Carolina, Columbia, SC (2006).*

Long, Zhao hua, Jia Zhen and Li Tao. "Research on Pervasive Computing Security." Symposia and Workshops on Ubiquitous, Autonomic and Trusted Computing, 2010.*

Russian Decision on Grant of a Patent for Invention regarding Application No. 2010128379, dated Sep. 15, 2011. Translation provided by Unitalen Attorneys At Law.

"Survey on 'Status of Identity Authentication Technologies.'" Security Center of Information-technology Promotion Agency, Japan. Mar. 2003.

Seiichiro Hayashi et al. "Encryption and Authentication Program Module." NTT Information and Communication Systems Laboratories. NTT R&D vol. 44 No. 10. 1995.

Hiroyuki Sugiyama et al. "Design and Implementation of User-Authentication System in Distributed Systems." NTT R&D vol. 45, No. 1. 1996.

* cited by examiner

ENTITY BIDIRECTIONAL AUTHENTICATION METHOD AND SYSTEM

This application claims priority to Chinese Patent Application No. 200710199241.3, filed with the Chinese Patent Office on Dec. 14, 2007 and titled "Method for two-way entity authentication", which is hereby incorporated by reference in its entirety.

FIELD OF THE INVENTION

The present invention relates to a method for two-way entity authentication and a system thereof.

BACKGROUND OF THE INVENTION

Entity authentication methods based on asymmetric cryptographic algorithm can be categorized into two types: one-way authentication method and two-way authentication method. The uniqueness or timeliness of authentication is identified by time variant parameters, which normally may be a time stamp, a sequence number, a random number, etc. If a time stamp or sequence number is used as the time variant parameter, then the one-way authentication between entities can be completed by one pass authentication, and the two-way authentication between entities can be completed by two pass authentication; and if a random number is used as the time variant parameter, then the one-way authentication between entities can be completed by two pass authentication, and the two-way authentication between entities can be completed by three pass authentication or four pass authentication (i.e., two parallel one-way authentication).

Figure 1:
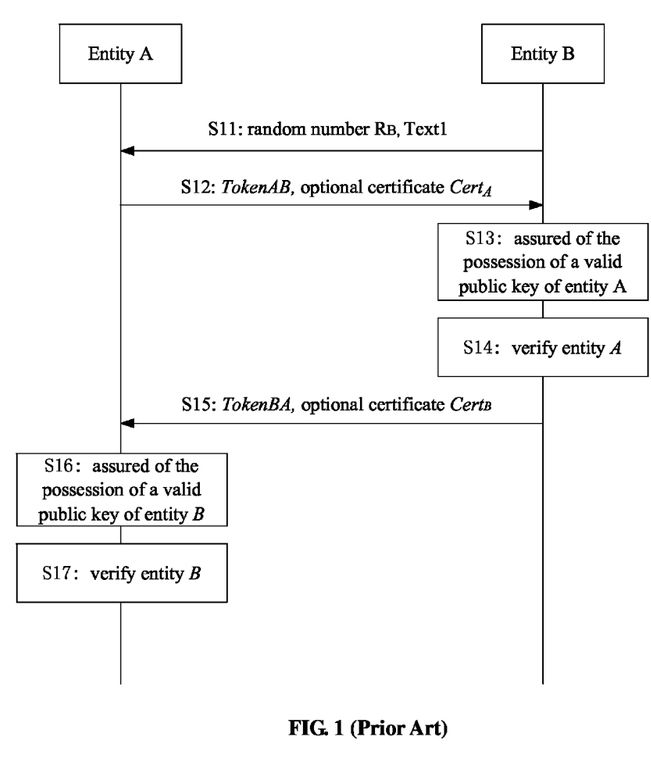
FIG. 1 illustrates authentication of a three pass authentication mechanism in the prior art.

In either one of the authentication mechanisms, prior to or during the authentication, the verifier must have the possession of a valid public key of the claimant; otherwise the authentication process may be damaged or may not be accomplished. A method for three pass two-way authentication is described hereinafter as an example:

Now refer to FIG. 1 with the tokens: TokenAB= $R_A \| R_B \| B \| Text3 \| sS_A(R_A \| R_B \| B \| Text2)$ and TokenBA= $R_B \| R_A \| R_A \| A \| Text5 \| sS_B(R_B \| R_A \| A \| Text4)$. X represents an entity distinguishing identifier, and the authentication system includes two authentication entities A and B; $Cert_X$ represents a certificate of the entity X; $sS_X$ represents a signature of the entity X; $R_X$ represents a random number generated by the entity X; and Text represents an optional text field.

The process of the three pass two-way authentication mechanism is described as follows:

Step S11: the entity B transmits a random number $R_B$ and an optional text field Text1 to the entity A;

Step S12: the entity A transmits the TokenAB and an optional certificate $Cert_A$ to the entity B;

Step S13: the entity B is assured of the possession of a valid public key of the entity A by verifying a certificate of the entity A or by some other means;

Step S14: the entity B obtains the public key of the entity A, verifies a signature of the entity A in TokenAB in step S12, verifies the entity distinguishing identifier B and checks whether the random number $R_B$ transmitted in step S11 is consistent with a random number $R_B$ in TokenAB, thereby the entity B accomplishes verification of the entity A;

Step S15: the entity B transmits the TokenBA and an optional certificate $Cert_B$ to the entity A;

Step S16: the entity A is assured of the possession of a valid public key of the entity B by verifying a certificate of the entity B or by some other means;

Step S17: the entity A obtains the public key of the entity B, verifies a signature of the entity B in TokenBA in step S15, verifies the entity distinguishing identifier A and checks whether the random number $R_A$ transmitted in step S12 is consistent with a random number $R_A$ in TokenBA and the random number $R_B$ received in step S11 is consistent with a random number $R_B$ in TokenBA, thereby the entity A accomplishes verification of the entity B.

As can be seen, to accomplish the three pass authentication mechanism, the entities A and B must have the possession of the other's valid public key. However, how to obtain the other's public key and its validity is not disclosed in the protocols. Currently, such requirement can not be satisfied in many application scenarios. For example, normally user access control is enabled in a communication network based on an entity authentication mechanism such that the access by a user to the network is not allowed until authentication is passed. Therefore, prior to the authentication, the user cannot or would have difficulty in accessing a certificate authority to obtain the validity of a public key of an opposing entity, i.e., a network access point, which results in failure to perform the authentication.

SUMMARY OF THE INVENTION

In view of this, the present invention provides a method for two-way entity authentication and a system thereof, in order to address the problem of failure to perform authentication due to the inability in the prior art to access the network prior to successful authentication.

An embodiment of the invention provides a method for two-way entity authentication, including the steps of:

transmitting, by a first entity, a first message carrying a time variant parameter $R_A$, an entity identity $ID_A$ and a signature;

transmitting, by a second entity, upon reception of the first message, to a trusted third party a second message carrying time variant parameters $R_A$ and $R_B$, the entity identity $ID_A$ of the first entity and an entity identity $ID_B$ of the second entity;

returning, by the trusted third party, upon reception of the second message, to the second entity a third message carrying a signature of the trusted third party and the time variant parameters $R_A$ and $R_B$;

obtaining, by the second entity, upon reception of the third message, an verification result for the first entity if verification of the signature of the trusted third party is passed and the time variant parameter $R_B$ is consistent with a locally stored time variant parameter $R_B$, and if the verification result indicates that the first entity is valid, then obtaining a public key of the first entity to verify the signature of the first entity in the first message, and if the verification is passed, then transmitting a fourth message carrying the signature of the trusted third party, a signature of the second entity and the time variant parameter $R_A$; and obtaining, by the first entity, upon reception of the fourth message, a verification result for the second entity if verification of the signature of the trusted third party is passed and the time variant parameter $R_A$ is consistent with a locally stored time variant parameter $R_A$, and if the verification result indicates that the second entity is valid, then obtaining a public key of the second entity to verify the signature of the second entity in the fourth message, thereby completing the authentication.

Preferably in the foregoing method, the third message is transmitted after verifying the validity of the first entity and the second entity.

Preferably in the foregoing method, the first entity and the second entity are valid if: the entity identities of the first entity and the second entity in the second message are certificates, and the certificates are valid.

Preferably in the foregoing method, the first entity and the second entity are valid if: the entity identities of the first entity and the second entity in the second message are entity distinguishing identifiers, and the public keys of the first entity and the second entity exist and are valid.

Preferably in the foregoing method, the time variant parameter is a random number, a time stamp, or a sequence number.

An embodiment of the invention further discloses a tri-element peer authentication system, including: a first entity, a second entity, and a third entity as a trusted third entity, and:

the first entity is adapted to transmit to the second entity a first message carrying a time variant parameter $R_A$ and an entity identity of the first entity $ID_A$ and a signature; to obtain a verification result for the second entity if verification of a signature of the third entity is passed and the time variant parameter $R_A$ is consistent with a locally stored time variant parameter $R_A$ upon reception of a fourth message carrying the signature of the third entity, a signature of the second entity and the time variant parameter $R_A$ returned by the second entity; and to obtain a public key of the second entity to verify the signature of the second entity in the fourth message if the verification result indicates that the second entity is valid;

the second entity is adapted to transmit to the third entity a second message carrying time variant parameters $R_A$ and $R_B$, the entity identity $ID_A$ of the first entity, and an entity identity $ID_B$ of the second entity upon reception of the first message; to obtain a verification result for the first entity if verification of the signature of the third entity is passed and the time variant parameter $R_B$ in the third message is consistent with a locally stored time variant parameter $R_B$ upon reception of a third message carrying the signature of the third entity and the time variant parameters $R_A$ and $R_B$ returned by the third entity; to obtain a public key of the first entity to verify the signature of the first entity in the first message if the verification result indicates that the first entity is valid; and to transmit the fourth message if the verification is passed; and the trusted third party is adapted to receive the second message and to return the third message to the second entity.

Preferably in the foregoing system, the third message is transmitted after verifying the validity of the first entity and the second entity.

Preferably in the foregoing system, the first entity and the second entity are valid if: the entity identities of the first entity and the second entity in the second message are certificates, and the certificates are valid.

Preferably in the foregoing system, the first entity and the second entity are valid if: the entity identities of the first entity and the second entity in the second message are distinguishing identifiers, and the public keys of the first entity and the second entity exist and are valid.

Preferably in the foregoing system, the time variant parameter is a random number, a time stamp, or a sequence number.

The invention employs a tri-entity architecture, in which prior to the authentication an authentication entity shall obtain a public key or a certificate of a trusted third party, and obtain a user certificate issued by the trusted third party or submit its own public key to the trusted third party, without the requirement of having to know in advance a valid public key of the opposing authentication entity. In protocol operation, the public key of the authentication entity and the validity thereof can be transmitted automatically to the opposing end by retrieval and verification at the trusted third party. In comparison with traditional authentication mechanisms, the invention defines an on-line retrieval and authentication mechanism for public keys, which enables centralized management thereof, simplifies operating conditions of the protocol, and facilitates its execution.

BRIEF DESCRIPTION OF THE DRAWINGS

Technical solutions in the embodiments of the invention or in the prior art would be better understood with the accompanying drawings of the embodiments of the invention or of the prior art. It should be noted that the drawings below are merely illustrative of some embodiments of the invention, and those skilled in the art may derive from the drawings other drawings without inventive efforts.

DETAILED DESCRIPTION OF THE INVENTION

Technical solutions of the invention would be better understood with the description of the embodiments below with reference to the accompanying drawings of the embodiments of the invention. It should be noted that the described embodiments are merely some of the possible embodiments of the invention, and those skilled in the art may obtain other embodiments based on the embodiments described in the invention without inventive efforts, which should be included in the scope of the invention.

Figure 2:
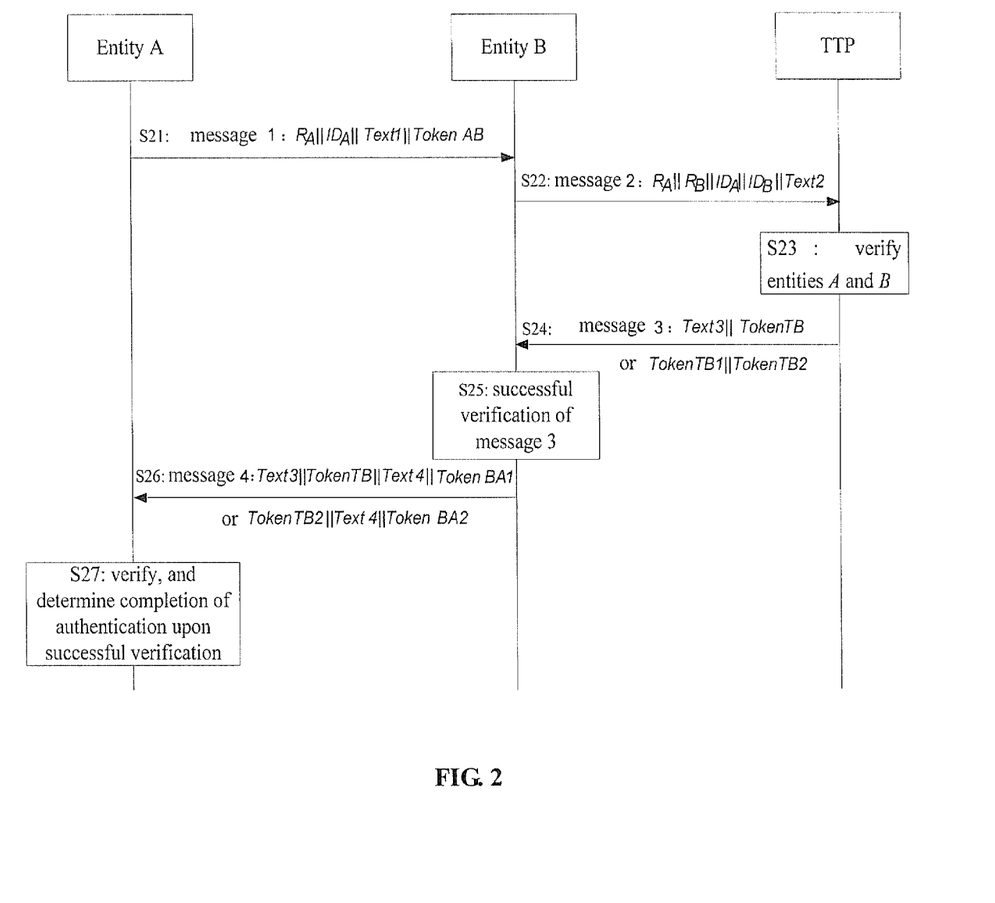
FIG. 2 is a schematic diagram of a two-way authentication method according to an embodiment of the invention.

Reference is made to FIG. 2, which illustrates a schematic diagram of a method for two-way entity authentication according to an embodiment of the invention.

The method according to the embodiment of the invention relates to three entities: two authentication entities A and B, and a Trusted Third Party (TTP). The TTP is a trusted third party of the authentication entities A and B. Such a system with peer authentication between two entities A and B performed via a trusted third party is referred to as a Tri-element Peer Authentication (TePA) system. $Valid_X$ represents the validity of a certificate $Cert_X$; $PublicKey_X$ represents a public key of an entity X (X represents A or B); $ID_X$ represents an identity of the entity X, and is represented by the entity distinguishing identifier X or the certificate $Cert_X$; $Pub_X$ represents a verification result of for the entity X, and includes the certificate $Cert_X$ and its validity $Valid_X$, or the entity distinguishing identifier X and its public key $PublicKey_X$; and Token represents a token field defined as follows:

$TokenAB = sS_A(R_A \| ID_A \| Text1)$ $TokenTB = R_A \| R_B Pub_A \| Pub_B \| sS_{TP}(R_A \| R_B \| Pub_A \| Pub_B \| Text3)$ $TokenTB1 = R_B \| Pub_A \| Text5 \| sS_{TP}(R_B \| Pub_A \| Text5)$ $TokenTB2 = R_A \| Pub_B \| Text6 \| sS_{TP}(R_A \| Pub_B \| Text6)$ $TokenBA1 = sS_B(Text3 \| TokenTB \| Text4 \|)$ $TokenBA2 = sS_B(TokenTB2 \| Text4)$ A detailed process is described as follows:

Step S21: the entity A transmits to the entity B a message 1, including a time variant parameter $R_A$, an identity $ID_A$, the token TokenAB and an optional text field Text1;

Step S22: upon reception of the message 1, the entity B transmits to the TTP a message 2, including time variant parameters $R_A$ and $R_B$, entity identities $ID_A$ and $ID_B$, and an optional text field Text2;

Step S23: upon reception of the message 2, the TTP verifies the entities A and B;

Particularly, if the entity identities of the entities A and B in the message 2 are certificates, then the validity of the certificates of the entities A and B are checked, and if they are invalid, then the message 2 is discarded directly or a message 3 is returned; if they are valid, then the message 3 is returned.

If the entity identities of the entities A and B in the message 2 are entity distinguishing identifiers, then respective public keys of the entities A and B are retrieved and verified; and if no public keys are found or are invalid, then the message 2 is discarded directly or the message 3 is returned; if the public keys are retrieved and valid, the message 3 is returned.

Figure 3:
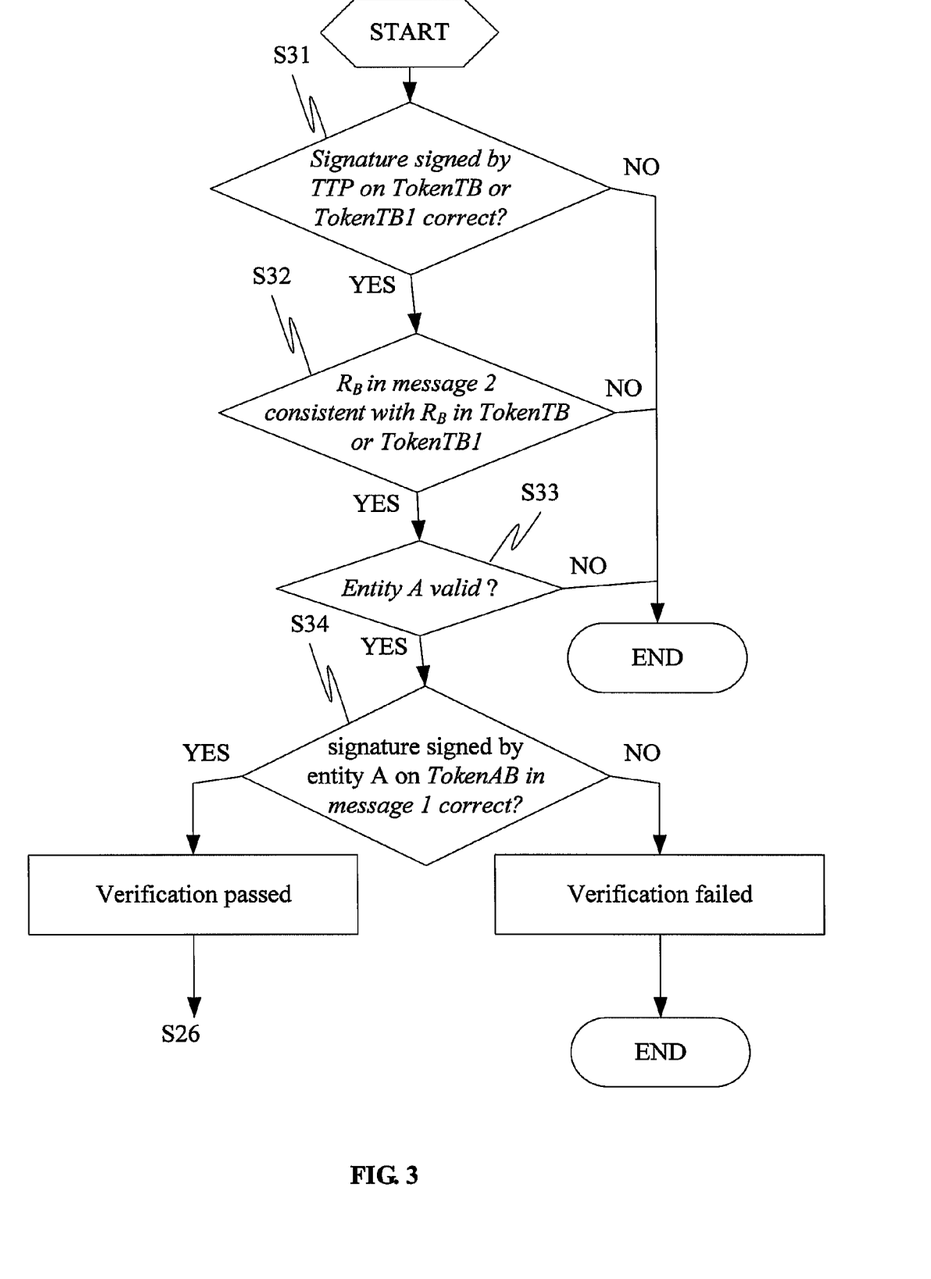
FIG. 3 is a schematic diagram of a verification process by the entity B in the method illustrated in FIG. 1.

Step S24: after verifying the entities A and B, the TTP returns to the entity B the message 3 including the token TokenTB and an optional text field Text3 or including the tokens TokenTB1 and TokenTB2;

Step S25: upon reception of the message 3, the entity B performs verification;

As illustrated in FIG. 3, a detailed verification process by the entity B includes the following steps:

Step S31: a signature signed by the TTP on TokenTB or TokenTB2 is verified, and if the verification is passed, go to step S32; otherwise, end the process;

Step S32: it checks whether the time variant parameter $R_B$ in the message 2 is consistent with the time variant parameter $R_B$ in TokenTB or TokenTB1, and if they are consistent, go to step S33; otherwise, end the process;

Step S33: a verification result for the entity A $Pub_A$ is obtained; and if the entity A is valid, go to step S34; otherwise, end the process;

Step S34: the public key of the entity A is obtained, and a signature signed by the entity A on TokenAB in the message 1 is verified; and if the signature is correct, then it determines that the verification is passed.

It shall be noted that, in other embodiments, the step of verifying the signature signed by the TTP on TokenTB or TokenTB1 may be performed following the step of checking whether the time variant parameter $R_B$ in the message 2 is consistent with the time variant parameter $R_B$ in TokenTB or TokenTB1.

It shall further be noted that, alternatively, step S26 may be performed directly in the case that the entity A is determined to be invalid in step S33.

Step S26: after verifying the message 3, the entity B transmits to the entity A a message 4 including the tokens TokenTB and TokenBA1 and two optional text fields Text3 and Text4 or including the tokens TokenTB2 and TokenBA2 and an optional text field Text4. It shall be noted that, if the message 3 includes the token TokenTB and the optional text Text3, then the message 4 includes the tokens TokenTB and TokenBA1 and the optional text fields Text3 and Text4; and if the message 3 includes the tokens TokenTB1 and TokenTB2, then the message 4 includes the tokens TokenTB2 and TokenBA2 and the optional text Text4.

Figure 4:
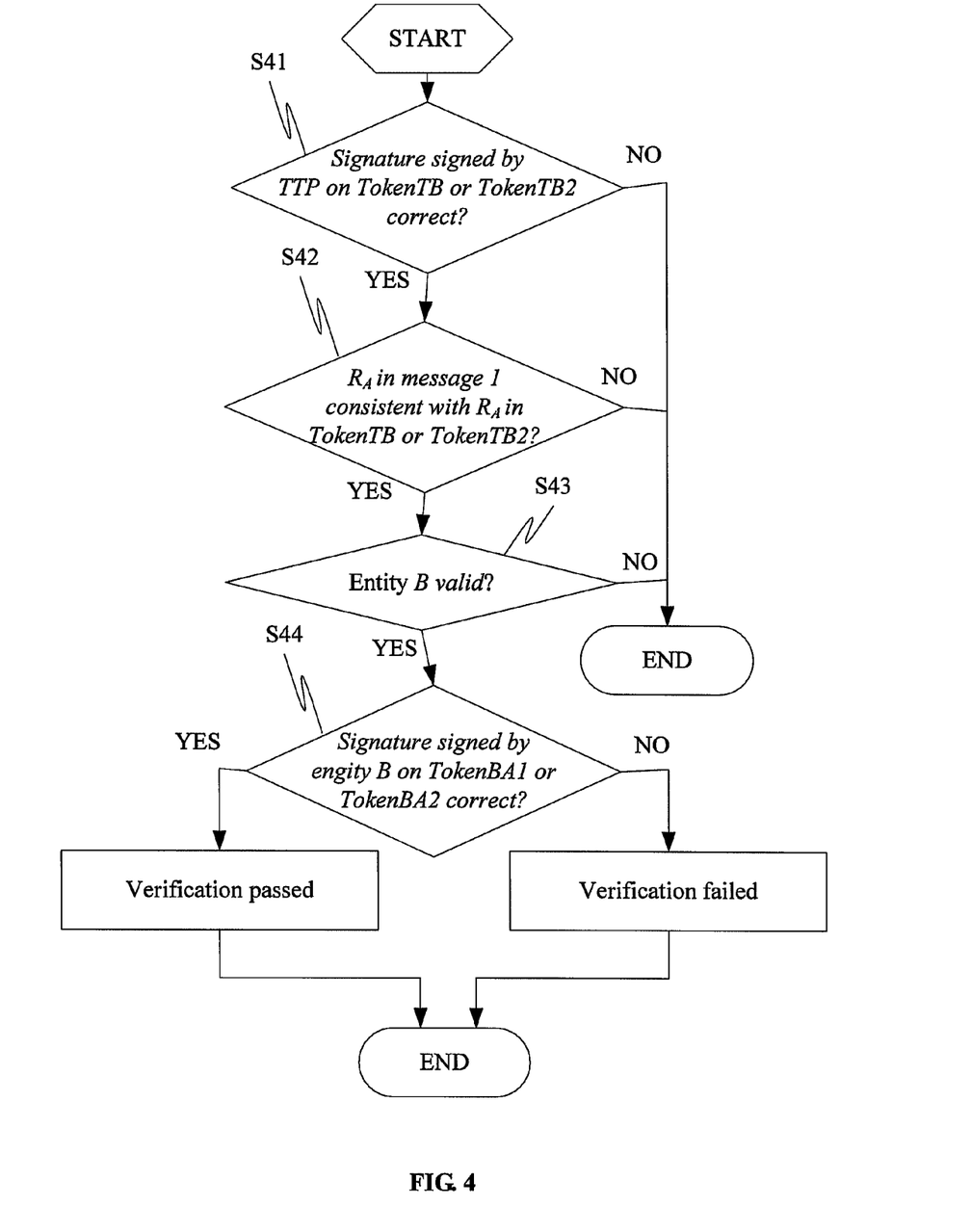
FIG. 4 is a schematic diagram of a verification process by the entity A in the method illustrated in FIG. 1.

Step S27: the entity A performs verification upon reception of the message 4;

As illustrated in FIG. 4, a detailed verification process by the entity A includes the following steps:

Step S41: a signature signed by the TTP on TokenTB or TokenTB2 is verified, and if the verification is passed, then go to step S42; otherwise, end the process;

Step S42: it checks whether the time variant parameter $R_A$ in the message 1 is consistent with the time variant parameter $R_A$ in TokenTB or TokenTB2, and if they are consistent, go to step S42; otherwise, end the process;

Step S43: a verification result for the entity B $Pub_B$ is obtained; and if the entity B is valid, then go to step S44; otherwise, end the process;

Step S44: the public key of the entity B is obtained, and a signature signed by the entity B on TokenBA1 or TokenBA2 is verified; and if the verification is passed, then the authentication is accomplished.

It shall be noted that the step of verifying the signature signed by the TTP on TokenTB or TokenTB2 may be performed following the step of checking whether the time variant parameter $R_A$ in the message 1 is consistent with the time variant parameter $R_A$ in TokenTB or TokenTB2.

It shall further be noted that the time variant parameter in the invention may be a random number, a time stamp or a sequence number.

Figure 5:
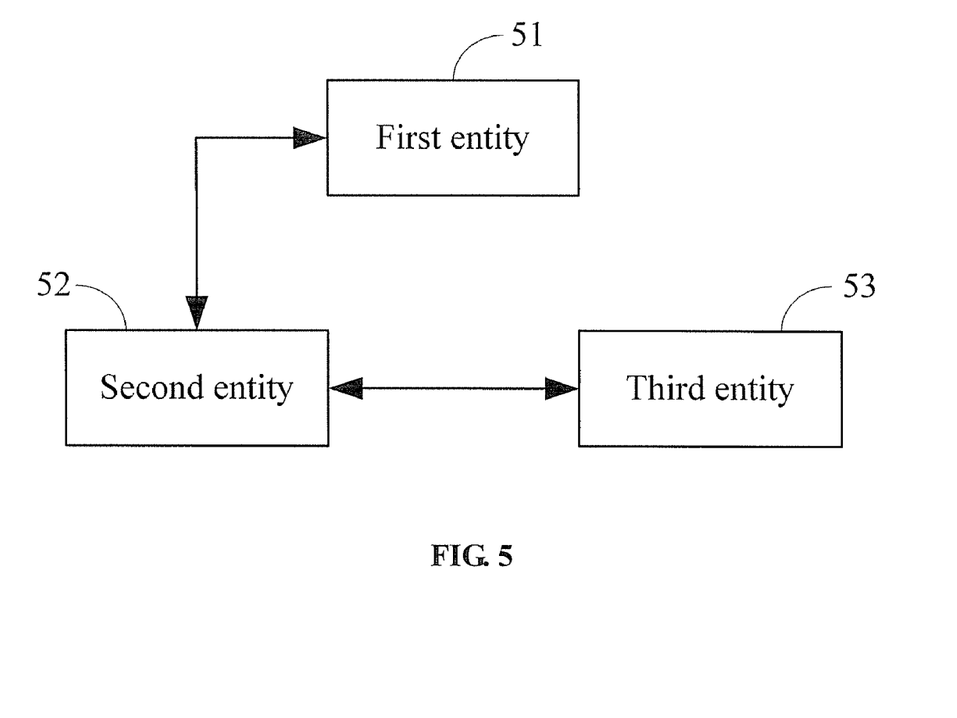
FIG. 5 is a schematic diagram of a tri-element peer authentication system according to an embodiment of the invention.

In view of the foregoing method, an embodiment of the invention further provides a system for implementing the method, i.e., a Tri-element Peer Authentication (TePA) system as illustrated in FIG. 5, which includes a first entity 51, a second entity 52 and a third entity 53.

The third entity 53 is a trusted third party of the first entity 51 and the second entity 52;

The first entity 51 is adapted to transmit to the second entity a first message carrying a time variant parameter $R_A$, its own identity $ID_A$ and a token TokenAB, to receive a fourth message carrying tokens TokenTB and TokenBA1 or carrying tokens TokenTB2 and TokentBA2 transmitted from the second entity 52, to verify a signature signed by the third entity 53 on the token TokenTB or TokenTB2, to check whether the time variant parameter $R_A$ is consistent with the time variant parameter $R_A$ in TokenTB or TokenTB2, and if they are consistent, then to obtain a verification result for the second entity 52, and if the verification result indicates that the second entity 52 is valid, then to obtain a public key of the second entity 52 to verify a signature signed by the second entity 52 on the token TokenBA1 or TokenBA2 in the fourth message.

The second entity 52 is adapted to transmit to the third entity 53 a second message carrying the time variant parameters $R_A$ and $R_B$, the identity $ID_A$ of the first entity 51 and its own identity $ID_B$ upon reception of the first message, to receive a third message carrying the token TokenTB or carrying the tokens TokenTB1 and TokenTB2 returned from the third entity, to verify a signature signed by the third entity 53 on the token TokenTB or TokenTB1, to check whether the time variant parameter $R_B$ is consistent with the time variant parameter $R_B$ in TokenTB or TokenTB1, and if they are consistent, then to obtain a verification result for the first entity 51, and if the verification result indicates that the first entity 51 is valid, then obtain a public key of the first entity 51 to verify a signature signed by the first entity 51 on TokenAB in the first message, and to transmit the fourth message upon successful verification.

The third entity 53 is adapted to receive the second message, and to return the third message to the second entity 52 after performing verification for the first entity 51 and the second entity 52.

For detailed interactive processes between the respective entities in this embodiment, please refer to the foregoing descriptions of the foregoing method.

Based on the description above of the disclosed embodiments, those skilled in the art can implement or use the invention. Various modifications to the embodiments would be apparent to those skilled in the art. The general principle defined herein can be practiced in other embodiments without departing from the spirit or scope of the invention. Accordingly, the invention is limited to the embodiments illustrated herein but shall be accorded with the broadest scope consistent with the principle and novel features disclosed herein.

The invention claimed is:

1. A method for two-way entity authentication, comprising:
   transmitting, by a first entity, a first message carrying a time variant parameter $R_A$, an entity identity $ID_A$ and a signature;
   transmitting, by a second entity, upon reception of the first message, to a trusted third party a second message carrying time variant parameters $R_A$ and $R_B$, the entity identity $ID_A$ of the first entity and an entity identity $ID_B$ of the second entity;
   returning, by the trusted third party, upon reception of the second message, to the second entity a third message carrying a signature of the trusted third party and the time variant parameters $R_A$ and $R_B$;
   obtaining, by the second entity, upon reception of the third message, a verification result for the first entity if verification of the signature of the trusted third party is passed and the time variant parameter $R_B$ is consistent with a locally stored time variant parameter $R_B$, and if the verification result indicates that the first entity is valid, then obtaining a public key of the first entity to verify the signature of the first entity in the first message, and if the verification is passed, then transmitting a fourth message carrying the signature of the trusted third party, a signature of the second entity and the time variant parameter $R_A$; and
   obtaining, by the first entity, upon reception of the fourth message, a verification result for the second entity if verification of the signature of the trusted third party is passed and the time variant parameter $R_A$ is consistent with a locally stored time variant parameter $R_A$, and if the verification result indicates that the second entity is valid, then obtaining a public key of the second entity to verify the signature of the second entity in the fourth message, thereby completing the authentication.

2. The method for two-way entity authentication according to claim 1, wherein the third message is transmitted after verifying the validity of the first entity and the second entity.

3. The method for two-way entity authentication according to claim 2, wherein the first entity and the second entity are valid if: the entity identities of the first entity and the second entity in the second message are certificates, and the certificates are valid.

4. The method for two-way entity authentication according to claim 2, wherein the first entity and the second entity are valid if: the entity identities of the first entity and the second entity in the second message are entity distinguishing identifiers, and the public keys of the first entity and the second entity exist and are valid.

5. The method for two-way entity authentication according to claim 1, wherein the time variant parameter is a random number, a time stamp, or a sequence number.

6. A tri-element peer authentication system, comprising: a first entity, a second entity, and a third entity as a trusted third party, wherein:
   the first entity transmits to the second entity a first message carrying a time variant parameter $R_A$ and an entity identity of the first entity $ID_A$ and a signature; obtains a verification result for the second entity if verification of a signature of the third entity is passed and the time variant parameter $R_A$ is consistent with a locally stored time variant parameter $R_A$ upon reception of a fourth message carrying the signature of the third entity, a signature of the second entity and the time variant parameter $R_A$ returned by the second entity; and obtains a public key of the second entity to verify the signature of the second entity in the fourth message if the verification result indicates that the second entity is valid;
   the second entity transmits to the third entity a second message carrying time variant parameters $R_A$ and $R_B$, the entity identity $ID_A$ of the first entity, and an entity identity $ID_B$ of the second entity upon reception of the first message; obtains a verification result for the first entity if verification of the signature of the third entity is passed and the time variant parameter $R_B$ in the third message is consistent with a locally stored time variant parameter $R_B$ upon reception of a third message carrying the signature of the third entity and the time variant parameters $R_A$ and $R_B$ returned by the third entity; obtains a public key of the first entity to verify the signature of the first entity in the first message if the verification result indicates that the first entity is valid; transmits the fourth message if the verification is passed; and
   the trusted third party receives the second message and returns the third message to the second entity,
   wherein the first, second, and third entities include a transmitter to transmit messages and a receiver to receive messages.

7. The system according to claim 6, wherein the third message is transmitted after verifying the validity of the first entity and the second entity.

8. The system according to claim 7, wherein the first entity and the second entity are valid if: the entity identities of the first entity and the second entity in the second message are certificates, and the certificates are valid.

9. The system according to claim 7, wherein the first entity and the second entity are valid if: the entity identities of the first entity and the second entity in the second message are entity distinguishing identifiers, and the public keys of the first entity and the second entity exist and are valid.

10. The system according to claim 6, wherein the time variant parameter is a random number, a time stamp, or a sequence number.

* * * * *